(12) United States Patent
Peoppelmeier et al.

(10) Patent No.: US 8,062,791 B1
(45) Date of Patent: Nov. 22, 2011

(54) BATTERY CATHODE

(75) Inventors: Kenneth R. Peoppelmeier, Evanston, IL (US); Frederic Sauvage, Gumefens (CH); Vincent Bodenez, Ploudern (FR); Jean-Marie Tarascon, Mennecy (FR)

(73) Assignee: Northwestern University, Evanston, IL (US)

( * ) Notice: Subject to any disclaimer, the term of this patent is extended or adjusted under 35 U.S.C. 154(b) by 834 days.

(21) Appl. No.: 12/157,443

(22) Filed: Jun. 10, 2008

Related U.S. Application Data (60) Provisional application No. 60/934,160, filed on Jun. 11, 2007.

(51) Int. Cl.
*H01M 4/34* (2006.01)
*H01M 4/54* (2006.01)
*H01M 4/58* (2006.01)
*H01M 10/32* (2006.01)

(52) U.S. Cl. ..................... 429/219; 429/231.5
(58) Field of Classification Search .................. 429/219, 429/232, 231.5; 252/182.1
See application file for complete search history.

(56) References Cited

U.S. PATENT DOCUMENTS

| | | | |
|---|---|---|---|
| 4,310,609 A | 1/1982 | Liang et al. | 429/194 |
| 4,391,729 A | 7/1983 | Liang et al. | 252/182.1 |
| 4,710,439 A * | 12/1987 | Tarascon | 429/338 |
| 4,751,159 A * | 6/1988 | Tarascon | 429/219 |
| 4,830,940 A | 5/1989 | Keister et al. | 429/194 |
| 5,221,453 A | 6/1993 | Crespi | 204/291 |
| 5,645,960 A * | 7/1997 | Scrosati et al. | 429/219 |
| 5,674,645 A * | 10/1997 | Amatucci et al. | 429/224 |
| 7,790,317 B1 * | 9/2010 | Poeppelmeier et al. | 429/219 |

OTHER PUBLICATIONS

Brodd, R.J.; Bullock, K.R.; Leising, R.A.; Middaugh, R.L.; Miller, J.R.; Takeuchi, E.S., Batteries, 1977-2002, Journal of the Electrochemical Society, 151, K1-K11, Jan. 2004.
Takeuchi, E.S.; Quattrini, P.J.; Greatbatch, W., Lithium/Silver Vanadium Oxide Batteries for Implantable Defibrillators, Pace-Pacing and Clinical Electrophysiology, 11, 2035-2039, Nov. 1998.
Crespi, A.M.; Skarstad, P.M.; Zandbergen, H.W., Characterization of silver vanadium oxide cathode material by high-resolution electron microscopy, Journal of Power Sources, 1995, 54, 68-71.
Crespi, A.M.; Somdahl, P.M.; Schmidt, C.L.; Skarstad, P.M.; Evolution of power sources for implatable cardioverter defibrillators, Journal of Power Sources, 2001, 96, 33-38.
Garcia-Alvarado, F.; Tarascon, J.M.; Lithium intercalation in $Ag_2V_4O_{11}$, Solid State Ionics, 1994, 73, 247-254.
Leising, R.A.; Takeuchi, E.S.; Solid-State Materials for Lithium Batteries: Effect of Synthesis Temperature on the Physical and Electrochemical Properties of Silver Vanadium Oxide, Chemistry of Materials, 1993, 5, 738-742.
Leising, R.A.; Takeuchi, E.S.; Solid-State Synthesis and Characterization of Silver Vanadium Oxide for Use as a Cathode Material for Lithium Batteries, Chemistry of Materials, 1994, 6, 489-495.

(Continued)

*Primary Examiner* — Helene Klemanski (57) ABSTRACT

A battery cathode comprises an electrode of silver, molybdenum, oxygen, fluorine and chlorine and having a higher discharge capacity expressed as milliampere hour per gram of material (mAh/g) available from silver reduction at a potential above 3V as compared to that of SVO material versus lithium. The battery cathode compound can be represented by $Ag_6Mo_2O_7F_3Cl$. The cathode is devoted for primary lithium batteries application and most notably can be used in a medical battery, such as a defibrillator battery [e.g. implantable cardioverter defibrillator (ICD) battery] having a lithium metal anode.

12 Claims, 9 Drawing Sheets

OTHER PUBLICATIONS

Leising, R.A.; Thiebolt, W.C.; Takeuchi, E.S.; Solid-State Characterization of Reduced Silver Vanadium Oxide from the Li/SVO Discharge Reaction, Inorganic Chemistry, 1994, 33, 5733-5740.
Takeuchi, K.J.; Marschilok, A.C.; Davis, S.M.; Leising, R.A.; Takeuchi, E.S.; Silver vanadium oxides and related battery applications, Coordination Chemistry Reviews, 2001, 219, 283-310.
Takeuchi, E.S.; Leising, R.A.; Lithium Batteries for Biomedical Applications, MRS Bulletin, 27, 624-627, Aug. 2002.
Takeuchi, E.S.; Theibolt, W.C., The Reduction of Silver Vanadium Oxide in Lithium/Silver Vanadium Oxide Cells, Journal of the Electromechanical Society, 1988, 135, 2691-2694.
Takeuchi, K.J.; Leising, R.A.; Palazzo, M.J.; Marschilok, A.C.; Takeuchi, E.S.; Advanced lithium batteries for implantable medical devices: mechanistic study of SVO cathode synthesis, Journal of Power Sources, 2003, 119, 973-978.
Takeuchi, E.S.; Theibolt, W.C., Lithium Diffusion in Silver Vanadium Oxide, Journal of the Electromechanical Society, 1988, 135, C343-C343.
Theibolt, W.C.; Takeuchi, E.S.; The Step-Wise Reduction of Silver Vanadium Oxide in Lithium/Silver Vanadium Oxide Cells, Journal of the Electrochemical Society, 1987, 134, C403-C403.
Zandbergen, H.W.; Crespi, A.N.; Skarstad, P.M.; Vente, J.F.; Two Structures of $Ag_{2-x}V_4O_{11}$, Determined by High Resolution Electron Microscopy, Journal of solid State Chemistry, 1994, 110, 167-175.

Sorensen, E.M.; Izumi, H.K.; Vaughey, J.T.; Stern, C.L.; Poeppelmeier, K.R.; $Ag_4V_2O_6F_2$: An Electrochemically Active and High Silver Density Phase, J.AmChem.Soc., 127, 6347-6352, Apr. 2005.
Delacourt, C.; Poizot, P.; Levasseur, S.; Masquelier, C.; Size Effects on Carbon-Free $LiFePO_4$ Powders, Electrochem. Solid State Letters, 9(7), A352-A355, May 2006.
Sauvage, F.; Baudrin, E.; Laffont, L.; Tarascon, J.-M.; Origin of electrochemical reactivity enhancement of post-annealed $LiFePO_4$ thin films: Preparation of heterosite-type $FePO_4$, Solid State Ionics, 2007, 178(1-2), 145-152.
Sorensen, E.M.; Barry, S.J.; Jung, H.K.; Rondinelli, J.R.; Vaughey, J.T.; Poeppelmeier, K.R.; Three-Dimentionally Ordered Macroporous $Li_4Ti_5O_{12}$: Effect of Wall Structure on Electrochemical Properties, Chemistry of Materials, 2006, 18, 482-489.
Maggard, P.A.; Nault, T.S.; Stern, C.L.; Poeppelmeier, K.R.; Alignment of acentric $MoO_3F_3^{3-}$ anions in a polar material: $(Ag_3MoO_3F_3)$ $(Ag_3MoO_4)Cl$, Journal of Solid State Chemistry, 175, 27-33, Jan. 2003.
Heier, K.R; Norquist, A.J.; Wilson, C.G.; Stern, C.L.; Poeppelmeier, K.R.; $[pyH]_2[Cu(py)_4(MX_6)_2]$ $(MX_6)_2]$ $MX_6=ZrF_6^{2-}$, $NbOF_5^{2-}$, $MoO_2F_4^{2-}$; py = Pyridine): Rarely Observed Ordering of Metal Oxide Fluoride Anions, Inorg. Chem., 37, 76-80, Jan. 1998.

* cited by examiner

BATTERY CATHODE

This application claims the benefits and priority of provisional application Ser. No. 60/934,160 filed Jun. 11, 2007.

CONTRACTUAL ORIGIN OF THE INVENTION

This invention was made with government support under Grant/Contract No. DMR-0312136 awarded by the National Science Foundation and under Grant No. ONR-MURI #N00014-07-1-0620 awarded by the Office of Naval Research. The Government has certain rights in the invention.

FIELD OF THE INVENTION

The present invention relates to a battery cathode comprised of a compound of silver, molybdenum, oxygen, fluorine and chlorine; a battery and to a method of making a battery cathode.

BACKGROUND OF THE INVENTION

The current standard cathode material in medical lithium batteries (e.g. a defibrillator battery) is silver vanadium oxide (SVO) material represented by atomic formula $Ag_2V_4O_{11}$. Although SVO material has a high theoretical capacity of 450 mAh/g (milliampere hour per gram) based on $Ag^+/Ag$ and $V^{5+}/V^{3+}$ redox couple, not all of this capacity is accessible at practical voltages. During discharge, the cathode could insert seven lithium ions until it reaches a cut-off voltage of 1.5 V, resulting in a total practical gravimetric capacity of 315 mAh/g. This capacity is obtained through two plateaux. The first, involving mainly the reducton of $Ag^+$ to $Ag^0$ competing with the reduction of a portion of $V^{5+}$ to $V^{4+}$, is situated at a potential of around 3.25 V, which is the potential at which a defibrillator operates most efficiently. The material still insert lithium and reduces the $V^{5+}$ to $V^{4+}$ and $V^{3+}$ at 2.5 V creating a multiple valence state within the vanadium. However, the potential does not plateau for completing the reduction to $V^{3+}$ but instead it drops precipitously to the cut-off voltage. As a result of the low reduction potential, the aforementioned gravimetric capacity of SVO is not fully utilized in practical applications since a voltage below 1.5 V is too low to supply the power (power equals current times voltage) needed for a defibrillator and that cell resistance dramatically increase beyond x=6 $Li^+$ inserted. The medical battery industry desires battery cathode materials that can maintain a potential above 3 V for extended periods of time so as to optimize defibrillator function. Moreover, a battery cathode that is devoid of noxious vanadium and that provides chemical stability and electrochemical performance is desirable.

SUMMARY OF THE INVENTION

The present invention provides in one embodiment a battery cathode comprising a compound of silver, molybdenum, oxygen, fluorine and chlorine and having a higher discharge capacity expressed as milliampere hour per gram of material (mAh/g) available from silver reduction at a potential above 3V as compared to that of SVO material versus lithium.

In a particular illustrative embodiment of the invention, the battery cathode comprises a compound represented by $Ag_6Mo_2O_7F_3Cl$. The cathode can be used in a medical battery, such as a defibrillator battery [e.g. implantable cardioverter defibrillator (ICD) battery] having a lithium metal anode.

In a further embodiment of the present invention, a battery cathode is made by forming a layer comprising Ag—Mo—O—F—Cl material and carbon particles on an electrically conductive substrate.

Advantages of the present invention will become more readily apparent from the following detailed description of the invention taken with the following drawings.

DESCRIPTION OF THE INVENTION

The present invention provides a battery cathode that comprises a compound of silver, molybdenum, oxygen, fluorine, and chlorine and that provides advantages over SVO material by having increased discharge gravimetric capacity expressed as milliampere hour per gram of material (mAh/g) available from silver reduction at a potential above 3V as compared to that of SVO material. Illustrative of such battery cathode is a cathode that comprises a polar compound represented by $Ag_6 Mo_2O_7F_3Cl$ (SMOFC) and comprising $(MoO_3F_3)^{3-}$ and $(MoO_4)^{2-}$ chains templated around $Cl^-$. A cathode comprised of this dense silver SMOFC compound can exhibit very high discharge rate capability driven by (i) some electronic conduction path via the silver ions network and (ii) a crystal structure displaying large 3D (three dimensional) tunnels favorable for a high ionic conduction. As a result, a SMOFC cathode is able to deliver a capacity as high as 106 mAh/g at D rate as compared to 4 mAh/g for a SVO ($Ag_2V_4O_{11}$) cathode. The amount(s) of silver, molybdenum, oxygen, fluorine, and/or chlorine of the material can vary from the stoichiometric amount(s) of $Ag_6Mo_2O_7F_3Cl$ so long as the variant material exhibits increased capacity expressed as milliampere hour per gram of material (mAh/g) from silver reduction at a potential above 3V as compared to that of SVO material. As a result of this increased capacity, the manufacture of an SMOFC cathode for an ICD (implantable cardioverter defibrillators) battery could provide great performance enhancement throughout its higher capacity above 3V and low polarization acting to significantly improve the cathode reactivity vs. lithium (anode). An illustrative battery cathode pursuant to an embodiment of the invention comprises the SMOFC compound provided as a layer on an electrically conductive substrate.

The following EXAMPLES are offered to further illustrate but not limit the present invention:

Example 1

This Example describes the lithium insertion properties of $Ag_6Mo_2O_7F_3Cl$ (SMOFC), synthesized under hydrothermal conditions. A SMOFC cathode displays 133 mAh/g above 3 V (vs. $Li^+$/Li) owing to the subsequent biphasic transitions between $Li_{-0}$-SMOFC-$Li_{-2}$-SMOFC and $Li_{-2}$-SMOFC-$Li_{-4}$-SMOFC at 3.46 V and 3.39 V (vs. $Li^+$/Li), respectively. The high discharge rate capability of SMOFC is believed to result from its unique crystal structure which allows high lithium/silver ion conduction ($\sigma_{\perp[001]}=3\times10^{-2}$ S/cm ($\pm2\times10^{-2}$ S/cm) and $\sigma_{//[001]}=4\times10^{-3}$ S/cm ($\pm2\times10^{-3}$ S/cm)), although applicants do not wish or intend to be bound by any theory in this regard. Notably, a Li-driven silver displacement process has been highlighted by in situ XRD measurements combined with HRTEM investigations. The electrochemically-assisted displacement reaction of $Ag^+$ by $Li^+$ ions during the first six lithium inserted entails complete structure collapsing from $Li_4$-SMOFC.

$Ag_6Mo_2O_7F_3Cl$ (SMOFC) Synthesis Procedure $Ag_6Mo_2O_7F_3Cl$ was synthesized via a hydro(solvo)thermal route by means of self-contained FEP teflon reaction pouches. Three different preparations routes were adjusted, all using $Ag_2O$, $MoO_3$, 4-hydroxypyridine, $HF_{(aq)}$ (48-50%) and HCl (37%) reagents. The $Ag_2O$ was 99.99% by metals basis purity from Alfa Aesar, Ward Hill, Mass., the $MoO_3$ was 99.9995% by weight pure from Alfa AESAR), the 4-hydroxypyridine was 95% by weight pure from Aldrich Chemical Co., the HF was aqueous concentrated (e.g. 48-50% by weight) from Aldrich Chemical Co., and the HCl was aqueous concentrated HCl (e.g. 37.6% by weight) from Fisher Scientific used as received. Reagent amounts of deionized water were also used in the synthesis.

The first two preparation routes, which involve a similar ratio between Ag—Mo-4 hydroxypyridine-HF-HCl (3-2-1-40-0.75) are described in Table 1. The difference between the two products rests in the addition of an extra amount of water to the reaction. Decreasing the concentration of the species in solution by adding water drastically affects the nucleation vs. growth processes. While large transparent colourless hexagonal single crystals are obtained without water added to the reagents, smaller hexagonal single crystals are formed by adding 0.15 g of $H_2O$. An addition of 0.30 g of water continued to produce a significant particle size decrease but also provoked the loss of the hexagonal particle shape together with a yield decrease (approximately 10% based on Ag). Among the various synthesis performed, a second beige product was observed as part of the single crystals. On the other hand, the addition of 0.15 g of water to the pouch affords good reproducibility with 20% yield based on Ag and the remaining reagents left in solution. Beyond 0.30 g of water addition, SMOFC is still obtained; however extra unidentified phase(s) are also formed in most cases.

The third preparation route, which involves a different molar ratio between the reactants, is reported in Table 2. A light grey powder of SMOFC is recovered using 0.30 g of water similarly to the second route affording a good reproducibility over the experiments described and a significant yield increase to 72% based on Ag.

Even though the precise role of 4-hydroxypyridine in the reaction is not yet completely understood, its utilization is crucial in the SMOFC formation by preventing AgCl precipitated in the medium.

For all three synthetic routes, the pouches containing the reactants were heat sealed and subsequently placed inside a 125 mL PTFE Teflon liner, which was backfilled with 42 mL de-ionized $H_2O$. The autoclave was heated at 150° C. for 24 hours and then slowly cooled at 0.1° C./min to room temperature. The products from each pouch were recovered by vacuum filtration and rinsed thoroughly with water.

$Ag_4V_2O_6F_2$ (SVOF) and $Ag_2V_4O_{11}$ (SVO) Synthesis Procedure

For comparison purposes, $Ag_4V_2O_6F_2$ was prepared using FEP-teflon pouches technique using hydro(solvo)thermal synthesis (designated SVOF-HT). SVOF-HT was obtained using a molar ratio between $Ag_2O$, $V_2O_5$, $HF_{(aq)}$ (48-50% by weight) of 4:1:30. The pouches were placed in a 125 mL PTFE Teflon liner, which was prior backfilled with 42 mL de-ionized water. The autoclave was heated at 150° C. for 24 hours and gradually cooled to room temperature at a rate of 0.1° C./min. Red needle-like single crystals of SVOF are recovered by vacuum filtration in around 40% yield based on Ag.

$Ag_2V_4O_{11}$ (SVO) was synthesized by a similar procedure than SVOF-HT. A molar ratio between $Ag_2O$, $V_2O_5$, $HF_{(aq)}$ (48-50% by weight) of 1:2.5:35 produces pure SVO in 60% yield based on Ag.

Physical Characterization

X-ray powder diffraction (XRD) patterns were recorded in a ($\theta/2\theta$) configuration using a Bruker D8 diffractometer with Cu $K_\alpha$ radiation ($\lambda=0.15418$ nm). The particle size and morphology was investigated using an Environmental Scanning Electron Microscope (ESEM) FEI Quanta 200FEG coupled with an Energy Dispersion Spectroscopy (EDS) analysis system (Oxford Link Isis). In situ XRD experiments, collected with a Bruker D8 diffractometer, were performed using an electrochemical cell capped by a Be window working as current collector. The cell was controlled by a Mac Pile galvanostat, discharged at D/10 (i.e. insertion of 1 $Li^+$ in 10 h) and the XRD patterns collected at intervals of 0.125 $Li^+$ inserted. High Resolution Transmission Electron Microscopy investigations were carried out to further investigate the local structure of the discharged SMOFC. For this, the battery was dismantled in an Ar-filled glove box and the retrieved cathode was thoroughly washed three times in DMC before being deposited on a copper grid coated with a lacey-carbon film. A TEM sample holder, which allows the investigation of air sensitive materials, was used to prevent the discharged material from reacting with air before the microscopy investigations.

Electrochemical Tests

Figures 9, 9A:
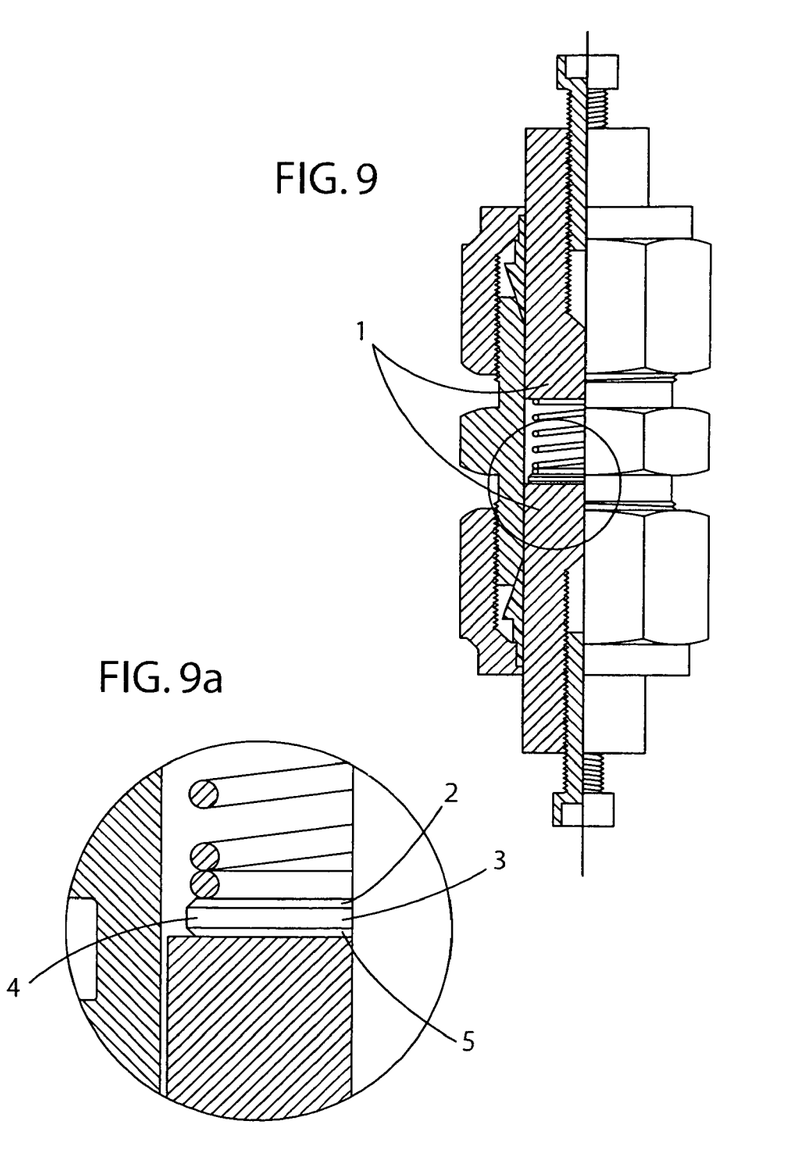
FIG. 9 is a partial sectional view of a Swagelok cell (battery) configuration used for the cathodes testing and FIG. 9a is an enlarged portion of the cell of FIG. 9.

Electrochemical characterization of SMOFC was carried out by manually grinding the single crystals thoroughly with 14% wt. amount of SP-type carbon black and composed the cathode of the battery. The two-electrode measurements were recorded using a Swagelok-type cell assembled in an Ar filled dry box. A lithium metal foil was used both as counter and reference electrodes. Two pieces of Whatman GF/D borosilicate glass fiber sheet separator 4, FIGS. 9 and 9a, were thoroughly soaked with 1M $LiPF_6$ EC/DMC 1:1 electrolyte (named LP30-Merck Selectipur grade). EC/DMC is ethyl carbonate and di-methyl carbonate, respectively. Current collectors 1, a nickel disc 2, the lithium anode 3, the glass separator 4, the cathode 5 and a spring 6 were assembled as a cell as shown in FIGS. 9 and 9a. The electrode cycling tests were monitored either by a VMP multi-potentiostat (Biologic SA, Claix, France) or a Mac Pile galvanostat system.

Results

Figures 1, 1A, 1B:
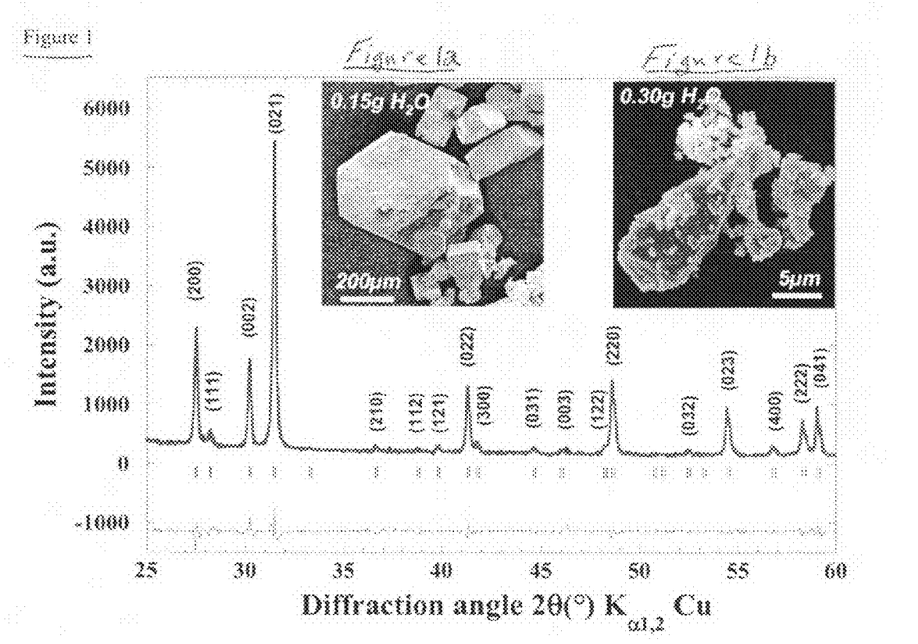
FIG. 1 is a full-pattern matching refinement of the X-ray diffraction pattern collected on the pristine $Ag_6Mo_2O_7F_3Cl$ (SMOFC) obtained using the second synthesis route with 0.15 g of $H_2O$.
In FIG. 1a and FIG. 1b (the insets), S.E.M. (scanning electron microscopy) images of the hexagonal single crystal and the smaller particles synthesized by adding 0.15 g and 0.30 g of water, respectively, are provided.

The recovered product from the second synthetic route described above is single phase as shown by the XRD refinement FIG. 1. All the reflections collected are indexed in the trigonal P3 m1 space group (n° 156) and the resulting refinement leads to lattice cell parameters of a=7.489(1) Å and c=5.917(1) Å. The S.E.M. micrographs, FIGS. 1a, 1b, show the hexagonal morphology of the single crystals which in some cases grew to half a millimeter long. Interestingly, as mention in the experimental part, an extra amount of water of c.a. 0.30 g further to the precursor pouch filling act to pursue in the particle size decreases giving rise to particles of around 10 μm sizes.

Figure 2:
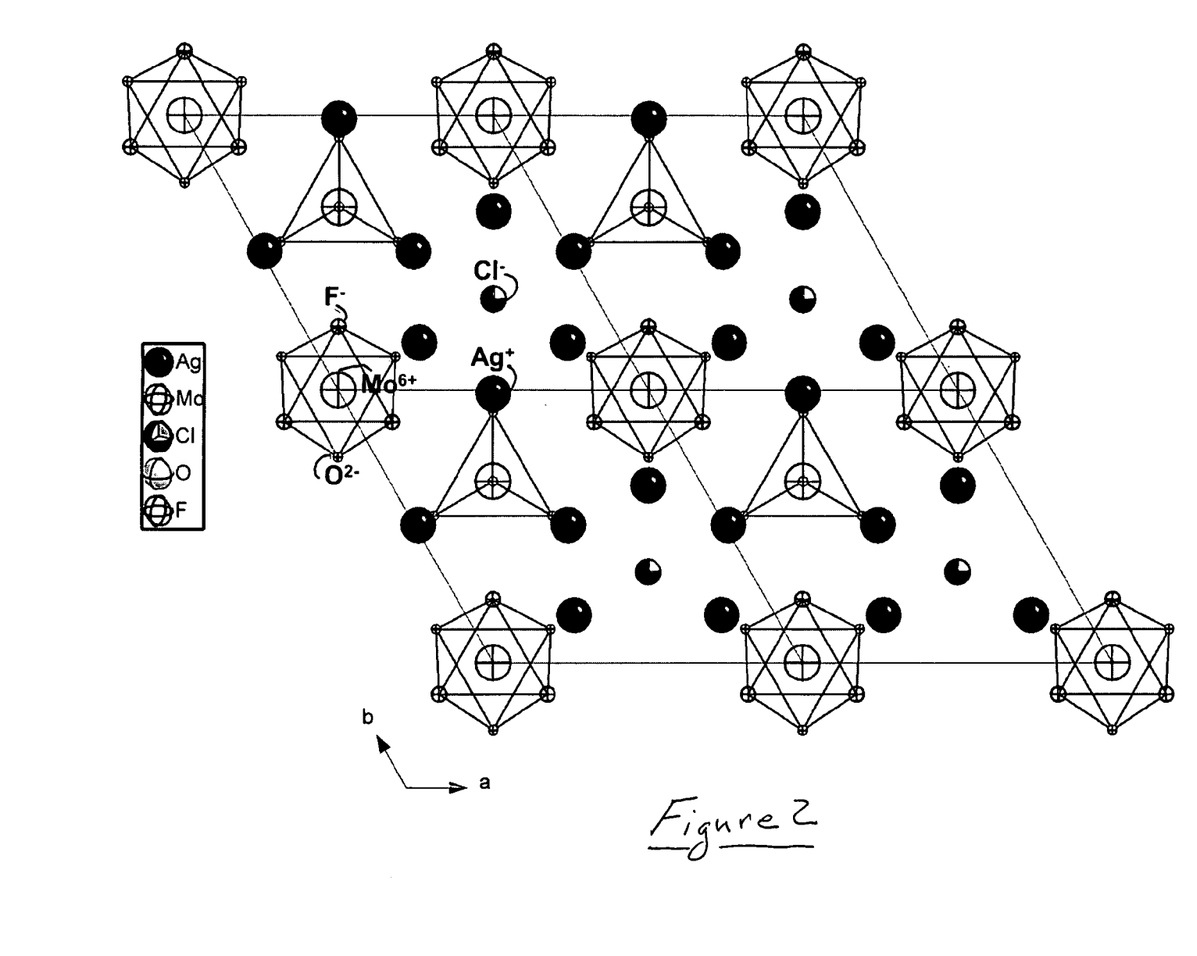
FIG. 2 is a crystal structure representation of SMOFC in the (ab) plane with the $Mo^{6+}$-centered polyhedron.

The $Ag_6Mo_2O_7F_3Cl$ compound crystallized in a hexagonal cell built up by chains of highly polar isolated $[MoO_3F_3]^{3-}$ octahedra and slightly distorted $[MoO_4]^{2-}$ tetrahedral anions (FIG. 2). $Cl^-$ anion plays the role of template for the integrity of the structure framework and also charge compensates the $MoO_4^{2-}$ chains with those of $MoO_3F_3^{3-}$. Two types of Ag cation arrange the structure; Ag(1) and Ag(2) situated within the closed environment of $MoO_3F_3^{3-}$ and $MoO_4^{2-}$ tetrahedral, respectively. The isolated character of the Mo polyhedra provides different path conduction for the silver. Nevertheless, the [100] and [010] directions appear of being the most favourable for the silver to withdraw. Further details on the crystal structural arrangement and the polarity properties of SMOFC are reported by P.A. Maggard et al. in J. of Solid State Chemistry, 175, pp. 27-33 (2003).

Figures 3, 3A:
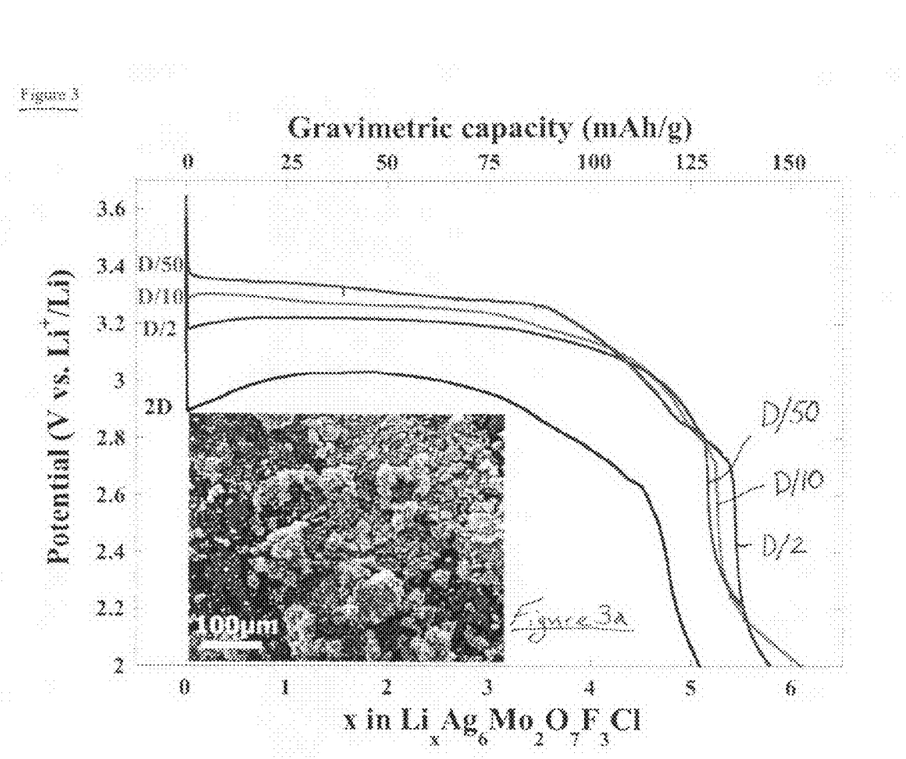
FIG. 3 illustrates the influence of the discharge rate from D/50 to 2D on the electrochemical discharge traces of a composite SMOFC/$C_{sp}$ electrode in 1M $LiPF_6$ EC/DMC 1:1 electrolyte down to 2V cut-off voltage.
In FIG. 3a (inset), a scanning electron microscopy picture of manually ground SMOFC single crystals with 14% wt. $C_{sp}$ is shown.

Leaving SMOFC material for approximately two months under light induces a slow photon-driven decomposition to AgCl, $Ag^0$ and an unidentified phase. Such decomposition is sensitively accentuated by decreasing the particle size. For this reason, all electrochemical investigations described herein have been performed on fresh ground single crystals with 14% weight Carbon sp ($C_{sp}$) where $C_{sp}$ ensures the role to provide good electron percolation between the particles of SMOFC within the cathode electrode. The grinding step allows the single crystals to mill into rock-like particles of heterogeneous size ranging from 10 to 50 μm (FIG. 3a inset). The discharge curve recorded at D/50 (where D/50 is 1 $Li^+$ exchange in 50 hours) shows the occurrence of two closed composition-potential plateaux centered between 3.40 and 3.30 V (vs. $Li^+$/Li), involving the insertion of around 4 $Li^+$ per formula unit (FIG. 3). Farther from the plateaux, a noticeable potential decrease down to 2 V is observed, leading to an overall insertion of 6 $Li^+$. SMOFC exhibits a gravimetric capacity of ~150 mAh/g and a volumetric capacity of 913 mAh/cm$^3$ ($\rho_{(SMOFC)}$=6.09 g/cm$^3$). It is noteworthy that such an insertion threshold is related to the silver stoichiometry within SMOFC. Increasing the discharge rate up to D/10, D/2 and 2D gives rise to a moderate polarization increase on the two plateaux where D/10 is 1 $Li^+$ inserted in 10 hours, D/2 is 1 $Li^+$ inserted in 2 hours, and 2D is 1 $Li^+$ inserted in 30 minutes. Faster discharge rates do not greatly affect the capacity above 2 V since nearly 6 $Li^+$ and 5 $Li^+$ can still be inserted at D/2 and 2D.

Figures 4, 4A:
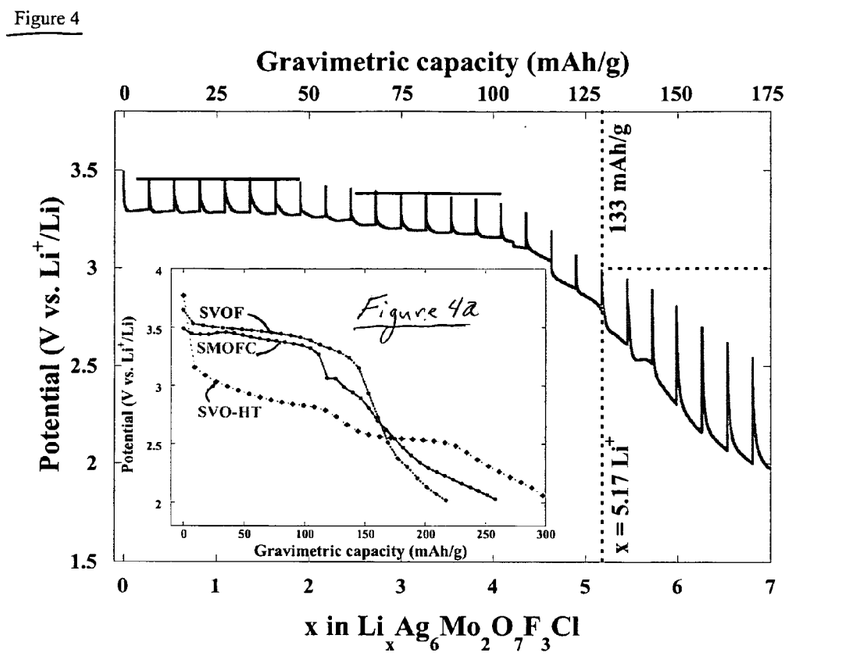
FIG. 4 is a G.I.T.T. (Galvanostatic Intermittent Titration Technique) discharge curve of SMOFC/$C_{sp}$ composite electrode in 1M $LiPF_6$ EC/DMC 1:1 electrolyte (D/10 discharge rate for 2 hours followed by 15 hours relaxation time).
In FIG. 4a (inset), a comparison of the discharge trace at equilibrium for SMOFC, SVOF and SVO-HT is shown.

To further evaluate the electrode polarization and the insertion mechanism, Galvanostatic Intermittent Titration Technique (GITT) experiment was carried out. A discharge rate of D/10 for 2 hours (c.a. insertion of 0.2 $Li^+$) was applied further to a relaxation step of 15 hours to allow the material releasing back to its equilibrium state (FIG. 4). The GITT traces better resolve the subsequence of the two biphasic transition at 3.46 V and 3.39 V (vs. $Li^+$/Li) involving equivalent number of electrons exchanged. The potential difference between the OCV curve and the one recorded under current (i.e. electrode polarization) is nearby 170 mV despite the large size of the particles. Such a polarization is significantly lower than the 400 mV recorded on SVOF-HT for which the particle size was comparable and the 260 mV for SVOF-RT. After 4 $Li^+$ inserted, the observed potential drop lies in a significant polarization increase. Above 3V, SMOFC exhibits a gravimetric capacity of 133 mAh/g owing to the insertion of nearby 5.2 $Li^+$ per formula unit. As a result of the low polarization and the high rate capability, no significant discrepancy on the electrochemical properties of SMOFC between ground single crystals and particles of 10 μm size has been evidenced even at the 2D rate. FIG. 4a compares the discharge trace at equilibrium for SMOFC, SVOF and SVO-HT.

The transport properties of SMOFC parallel and perpendicular to the [001] direction of the single crystal were evaluated by AC measurements at room temperature. Using Pt blocking electrodes, the impedance response solely traces the silver ion blocking signature at low frequencies. The spectra were simulated using a R-C equivalent electrical circuit. Interestingly, very high silver conduction for a crystalline material was found with conductivities as high as $\sigma_{(\perp)}$=3·10$^{-2}$ S/cm (±2·10$^{-2}$ S/cm) and $\sigma(//)$=4·10$^{-3}$ S/cm (±2·10$^{-3}$ S/cm) (n.b. error bars were evaluated by repeating the measurements on different single crystals). The one order magnitude decrease of the [001] conduction is consistent with crystal structure considerations. This high conduction appear to be the result from the opened 3D structure of SMOFC and provides comparable conduction than the actual glass silver conductors like, for instance, $AgI$—$Ag_2MWO_4$ (where M=W, Mo), although applicants do not wish or intend to be bound by any theory in this regard. The good electrochemical rate capability aforementioned despite the large particle size thus mirrors the high silver conduction within SMOFC.

Figure 5A:
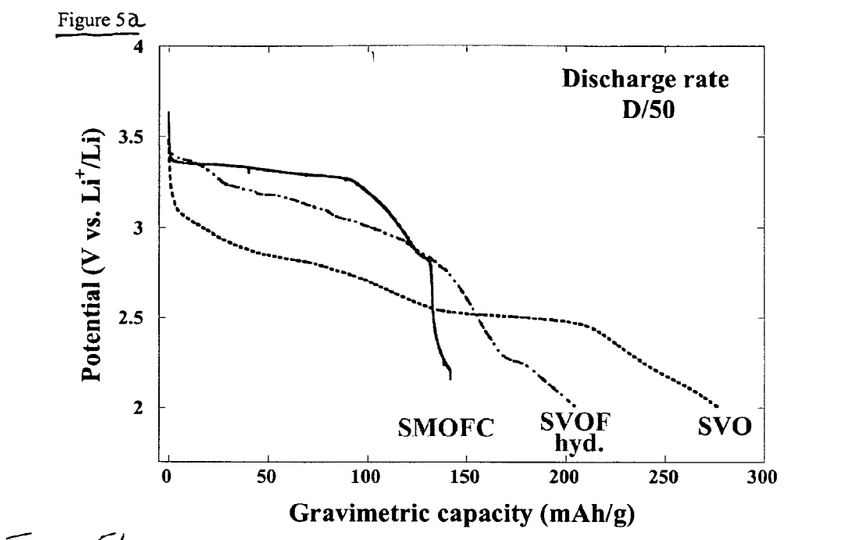
FIGS. 5a and 5b are galvanostatic-driven discharge comparisons between SMOFC, SVOF-HT, and SVO performed at D/50 and 2D, respectively, with the rate discharge capability curve above 2.50 V appearing in the inset of FIG. 5b.
Figure 5B:
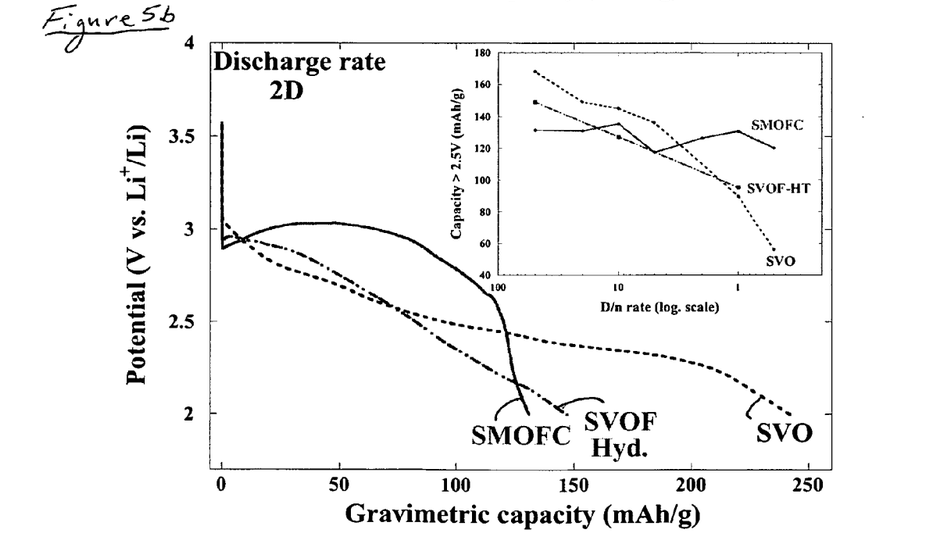

The electrochemical performance of SMOFC was compared to the discharge traces recorded for SVOF-HT, and SVO prepared under hydrothermal conditions. These data are shown together in FIGS. 5a, 5b. In order to compare these three cathode materials, the same electrochemical and electrode formation procedure was followed. The SVOF-HT and SMOFC display comparable particles size of around 10 μm-50 μm. On the other hand, SVO particles exhibit a flat needle-like morphology of 2-5 μm long, 200-1000 nm wide for a 50-100 nm thickness. Owing to the particle morphology/size/porosity discrepancies between electrodes; prudence is used in interpreting such a comparison. The silver reduction followed by $V^{5+}$ to $V^{4+}$ allows SVO to provide the highest gravimetric capacity above 2V at D/50 as well as at 2D. The oxyfluorides, however, have the advantage of delivering capacity at higher battery voltage on the first 150 mAh/g (up to 500-600 mV higher for SMOFC vs. the small SVO particles) and therefore would deliver more power out from the battery and consequently decrease the capacitors charge time. Raising the discharge rate at 2D to bring operating conditions closer to ICDs, a lower capacity gap is observed between SVOF and SMOFC beyond 2V because of the good rate capability of the latter. At such stringent discharge rate, SMOFC delivery potential is around 400 mV higher than SVO (FIG. 5b). In addition to the gravimetric capacity and potential delivering, the oxyfluorides exhibit a higher phase density of around 6.0 g/cm$^3$, compared to 4.80 g/cm$^3$ for SVO. FIG. 5b shows the evolution of gravimetric capacity as a function of the discharge rate above 2.5 V for SVO, SVOF-HT, and SMOFC. To summarize the pros and cons of SMOFC vs. SVOF and SVO, Table 2 gathers the different gravimetric and volumetric capacities for these considered materials, recorded at 2D discharge rate at different threshold potential of c.a. 3V, 2.5V and 2V (vs. Li$^+$/Li).

Figure 6A:
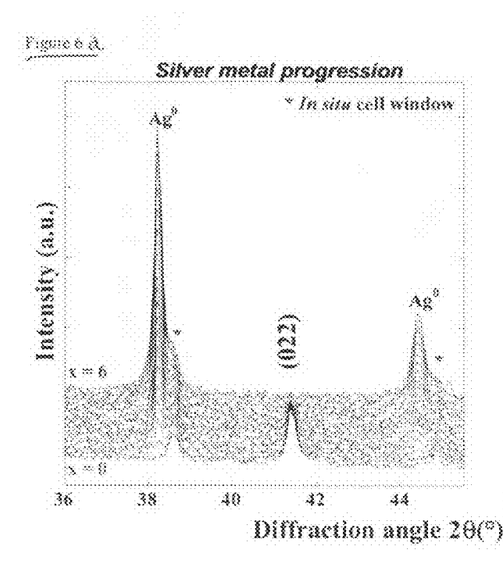
FIGS. 6a and 6b are an in situ evolution of the XRD pattern recorded every 0.25 $Li^+$ inserted at a D/10 discharge rate between $Li_0$-SMOFC to $Li_6$-SMOFC in a 2θ range of 36-45° (FIG. 6a) showing the silver appearance and 54-60° (FIG. 6b) showing SMOFC amorphization.
Figure 6B:
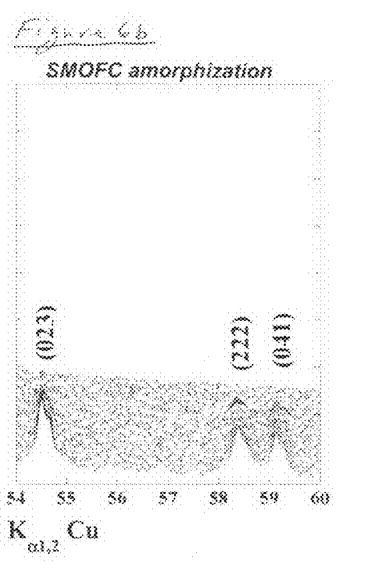
Figure 7A:
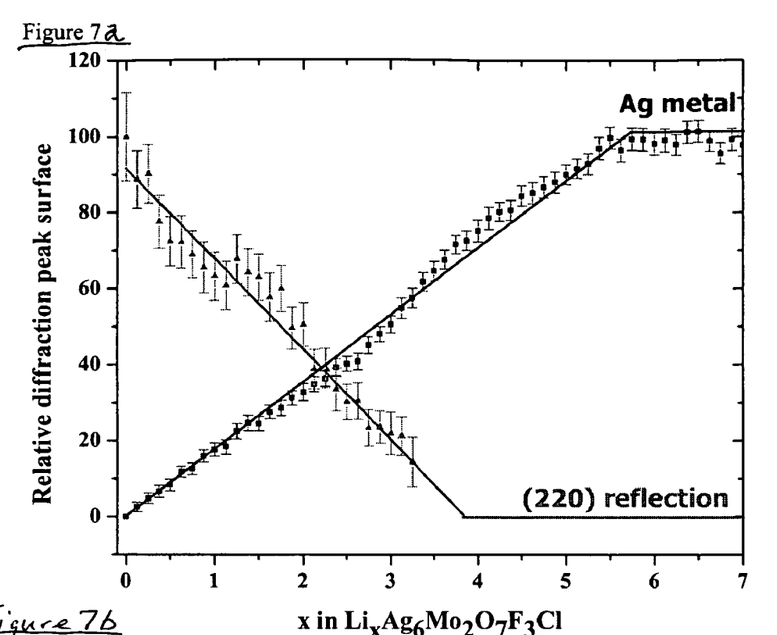
FIGS. 7a and 7b are an evolution of the silver metal and SMOFC XRD peak area as a function of x in $Li_x$SMOFC for the directions (220) (FIG. 7a) and (002) (FIG. 7b).
Figure 7B:
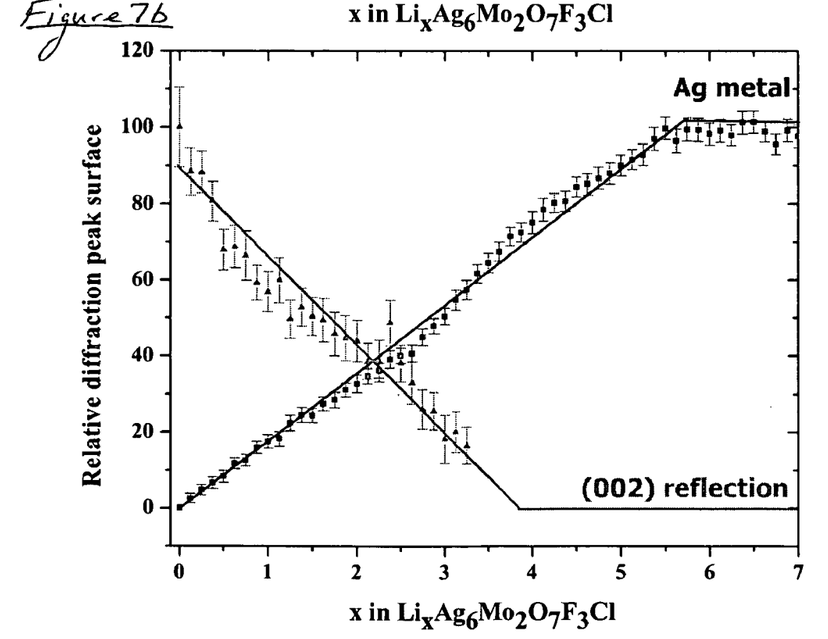

A complementary study was conducted by means of in situ XRD (X-ray diffraction) measurements during the battery discharge combined with HRTEM (high resolution TEM) investigations to scrutinize the effect of the lithium insertion on the SMOFC structure. FIGS. 6a, 6b show the successive diffractograms collected at different Li$_x$-SMOFC from x=0 to x=6 for each 0.25 Li$^+$ inserted. From the moment that lithium is inserted, two diffraction peaks centered at 38.2° and 44.4° ascribed to silver metal sprout progressively. A decrease in the SMOFC peak intensity without any peak shift is also noticed, consistent with a biphasic transition. We integrated the peak surface area of the silver and Li$_x$-SMOFC to track the progression of the silver reduction vs. the amorphization of Li$_x$-SMOFC. A linear intensifying of the silver peak surface as a function of the lithium insertion attaining a maximum nearby x=6 is observed (FIGS. 7a, 7b). No further progression of the Ag diffraction peak was noticed beyond this threshold. In contrast, the integrated intensity of the (220) and (002) reflections decreases in a linear fashion, which indicates continuous amorphization of the SMOFC structure. The Li$_z$-SMOFC structure becomes entirely collapsed at around x=4. A similar behaviour has also been experienced for the (200), (021) and (022) directions thus emphasizing the isotropic character of this structural amorphization. In light of such results, the degree of disorder of the Li$_x$-SMOFC phase appears to be directly linked to the macroscopic amount of lithium inserted and/or silver reduced.

Figure 8A:
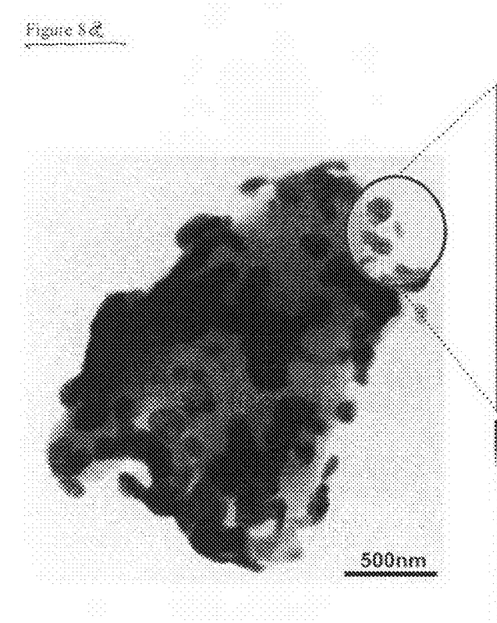
FIGS. 8a, 8b, and 8c are high resolution transmission electron microscopy (TEM) bright field images showing an example of an electrochemically discharged $Li_6$SMOFC particle.
Figure 8B:
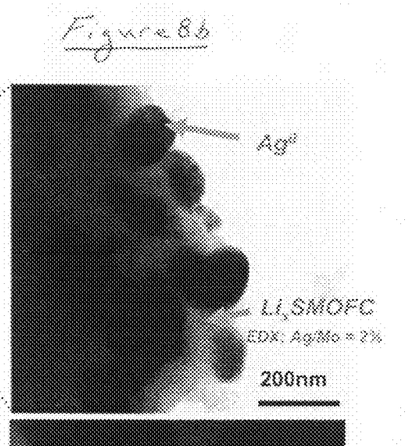
Figure 8C:
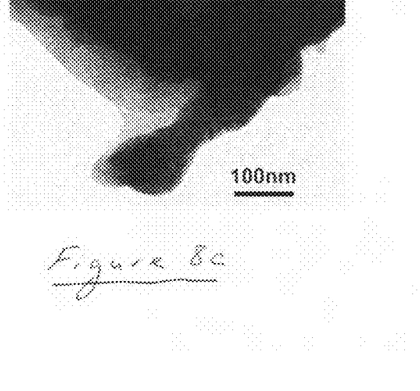

To study more in-depth the local structure of Li$_6$-SMOFC, SMOFC was electrochemically discharged at a D-rate and the reduced sample analyzed by HRTEM. Two clear contrasts within the particles are observed in the bright field image in FIGS. 8a, 8b, and 8c. EDX analysis on the sample assigned the dark regions to be exclusively silver. On the other hand, the light part of the particles belongs to Li$_6$-SMOFC with almost no silver remaining as deduced by EDX with a Ag/Mo ratio of around 2%. All the discharged particles observed were wrapped by silver metal particles which exhibit either spherical or dendritic-like morphologies. Neither long silver dendrites withdrawn nor nanocrystalline silver particles were observed as previously evidenced on SVOF samples. Furthermore, no relationship between discharge rates vs. metal particle morphology has been clearly evidenced, probably owing to the high rate capability of SMOFC. HRTEM studies performed on the light part of the particle confirm the entire structure amorphization without any reminiscence of nanocrystalline-sized domains. Beyond the high silver conduction of SMOFC, percolation of silver metal networking the inside of the particle also provides a high electronic conduction path.

In light of the different experiments carried out to evaluate the electrochemical properties of SMOFC cathodes and to gain insight on the lithium insertion mechanism, a simplistic scheme on the basis of the core-shell model is proposed, although applicants do not intend or wish to be bound by any proposed mechanism. The first biphasic transition depicts the isotropic progression of Li$_2$Ag$_4$MOFC on the shell of SMOFC with the reduction of two silver ions into silver metal. As a result of the formation of silver dendrites within Li$_2$Ag$_4$MOFC region and the increase of the Van der Waals electrostatic repulsion forces between the MoO$_4^{2-}$ and MoO$_3$F$_3^{3-}$ isolated chains, the structure of Li$_2$Ag$_4$MOFC turns into a less well organized framework to accommodate such significant structural stress. The second biphasic transition separates Li$_2$Ag$_4$MOFC from Li$_4$Ag$_2$MOFC among a similar progression mechanism. The XRD amorphous character of the latter results from the excess amount of silver dendrites and electrostatic repulsions between the MoO$_4^{2-}$ and MoO$_3$F$_3^{3-}$ chains. The lithium insertion between Li$_4$Ag$_2$MOFC and Li$_{5.9}$Ag$_{0.1}$MOFC progresses in an amorphous environment and gives rise to a solid solution-like insertion of lithium. The silver dendrite percolation within the particle together with the amorphous environment allows the molybdenum reduction at around 2.5V, however associated with an important polarization above 500 mV (FIG. 4). At lower potential than 2V, Mo reduction competes with the Ag/Li alloying reaction.

The electrochemical properties of the dense silver oxyfluoride-chloride, Ag$_6$Mo$_2$O$_7$F$_3$Cl are advantageous. Such a complex material by its formula displays an opened 3D crystal structure templated around Cl$^-$ anion by isolated MoO$_4^{2-}$ tetrahedra and MoO$_3$F$_3^{3-}$ octahedra. As a result, the lithium insertion properties of SMOFC cathodes yield appealing results with a capacity of 133 mAh/g available above 3V. The high silver ion conduction and redox potential result in a high rate capability, which could raise SMOFC interests for ICD applications.

TABLE 1

Synthesis conditions for the preparation of Ag$_6$Mo$_2$O$_7$F$_3$Cl single crystals.

|  | Ag$_2$O | MoO$_3$ | 4OH-pyr. | HF$_{aq}$ (48-50%) | HCl (37%) | H$_2$O |
|---|---|---|---|---|---|---|
| Ratio | 3 | 2 | 1 | 40 | 0.75 | 0 or 7.50 |
| n (mol) | 3.33.10$^{-3}$ | 2.22.10$^{-3}$ | 1.11.10$^{-3}$ | 2.22.10$^{-2}$ | 8.325.10$^{-4}$ | 0 or 8.33.10$^{-3}$ |
| w$_{(used)}$ | 0.773 g | 0.32 g | 0.107 g | 0.788 g | 0.013 g | 0 or 0.15 g |

TABLE 2

Synthesis conditions for the preparation of powder $Ag_6Mo_2O_7F_3Cl$.

|  | $Ag_2O$ | $MoO_3$ | 4OH-pyr. | $HF_{aq}$ (48-50%) | HCl (37%) | $H_2O$ |
|---|---|---|---|---|---|---|
| ratio | 2 | 2 | 5 | 30 | 4 | 4 |
| n (mol) | $2.22 \cdot 10^{-3}$ | $2.22 \cdot 10^{-3}$ | $5.55 \cdot 10^{-3}$ | $2.22 \cdot 10^{-2}$ | $4.44 \cdot 10^{-3}$ | $8.33 \cdot 10^{-3}$ |
| $w_{(used)}$ | 0.515 g | 0.32 g | 0.535 g | 0.591 g | 0.069 g | 0.15 g |

TABLE 3

Capacity comparison recorded at a 2D discharge rate between $Ag_6Mo_2O_7F_3Cl$ (SMOFC), $Ag_4V_2O_6F_2$ (SVOF) synthesized under hydrothermal conditions, and $Ag_2V_4O_{11}$ (SVO) prepared by hydrothermal synthesis.

|  | SMOFC 6.09 | | SVOF (hyd.) 6.03 | | SVO (HT) 4.80 | |
|---|---|---|---|---|---|---|
| $\rho$ (g/cm³) | mAh/g | mAh/cm³ | mAh/g | mAh/cm³ | mAh/g | mAh/cm³ |
| Capacity > 3 V | 65.7 | 399.5 | 0 | 0 | 1 | 4.8 |
| Capacity > 2.5 V | 120.1 | 731.5 | 82.5 | 497.5 | 60.4 | 289.9 |
| Capacity > 2 V | 130.7 | 796 | 146.7 | 884.6 | 218.8 | 1050 |

Example 2

A battery was constructed with a lithium foil anode and $LiPF_6$ 1M EC/DMC 1:1 electrolyte where EC is ethyl carbonate and DMC is dimethyl carbonate. The single crystals of SMOFC made by solvothermal method as follows: 0.773 g of $Ag_2O$ was introduced with 0.32 g of $MoO_3$ and 0.107 g of 4-hydroxypyridine within FEP Teflon pouch. 0.788 g of HF(aq) (48-50% wt.) was added to solubilize the oxides and the pyridine. Chloride source was provided by adding 0.013 g of HCl (37%) to the slurry. The pouches were heat sealed and placed in a 125 mL PTFE Teflon liner and backfilled with 42 mL de-ionized water. The autoclave was heated at 150° C. for 24 hours and then slowly cooled at 0.1° C./min to room temperature. The products from each pouches (up to 6 can be introduced at once per synthesis) were retrieved by vacuum filtration and rinsed thoroughly with de-ionized water.

The single crystals of SMOFC were manually ground during 30 minutes with around 14% wt. carbon (SP-type) and composed the cathode. Using a slow discharge rate of D/50 (i.e. 1 $Li^+$ exchange in 50 hours), the material inserts almost 6 $Li^+$ above 3V (vs. $Li^+$/Li). This astonishing ability to displace silver ions by lithium testifies the existence of some electron conduction path through $Ag^+$ ions within the structure. While the theoretical capacity and the potential of the silver reduction at OCV conditions are comparable to SVOF (approximately 150 mAh/g and approximately 3.4 V), the existence of large 3D tunnels enables more efficient pathways for the silver to exit. As a result, a much lower polarization is observed acting to boost the kinetics of the electrochemical phenomena. The galvanostatic-made discharge comparison among SMOFC, SVOF, and SVO operated at D/50 and D was similar to that shown in FIGS. 5a, 5b. For this comparison, the materials were synthesized by following the same route (solvothermal described above) and the electrode contained the same weight amount of Csp (approximately 14% by weight). Using D/50 rate, SMOFC and SVOF cathodes display a significant higher capacity than SVO above 3V owing to the greater Ag/M ratio. The potential of the silver reduction is sensitively superior in SMOFC because of (i) the lower polarization (ii) the fluorine within the silver environment which strengthen its ionicity. One could notice the advantage of SVO at 2.5V at D/50. Nonetheless, this discharge condition does not reflect the one practically required for ICD's devices. Indeed the two parallel capacitors placed after the battery needs to be recharged as fast as possible to allow the device to provide new shocks in case of continued arrhythmia. Using a faster discharge rate like 2D (i.e. 1 $Li^+$ inserted in 30 minutes), the kinetic benefit of using SMOFC, owing to its 3D tunnel structure, becomes more evident. A comparison between capacities at D/50 and D show a very slight decrease for SMOFC, while a drastic decrease for SVOF and SVO is observed. Table 4 gathers the gravimetric capacity values for SMOFC, SVOF and SVO above 3V and 2.5V using these two rates, D/50 and D. In light of all these results, the impact of manufacturing SMOFC as a cathode in ICD battery in replacement to SVO could be significant in terms of (i) environment by replacing the noxious V, (ii) battery power increase and hence faster capacitor rechargeability and (iii) possible battery size decrease owing to the greater crystal density of SMOFC ($\rho$=6.09 g/cm³) in comparison to only 4.80 g/cm³ for SVO. This latter would allow to dispose of the same amount of energy for a small volume and consequently the utilization of SMOFC as cathode could largely contribute in some advances on ICD's performances.

TABLE 4

Capacity recorded for SMOFC, SVOF and SVO synthesized by solvothermal method using D/50 and D discharge rates.

|  | SMOFC | | SVOF | | SVO | |
|---|---|---|---|---|---|---|
| Discharge Rate | D/50 | D | D/50 | D | D/50 | D |
| Capacity > 3 V (mAh/g) | 116.5 | 106.6 | 101.54 | 16.2 | 17.4 | 4 |
| Capacity > 2.5 V (mAh/g) | 133.4 | 130.7 | 155.5 | 95.2 | 178.9 | 89.7 |

Example 3

In this example, control of the particle growth of SMOFC was achieved by using an appropriate amount of water during the synthesis. For example, addition of 0.30 g of $H_2O$ further to the 3:2:1:40:0.75 ratio of $Ag_2O$, $MoO_3$, 4-hydroxy-pyridine, $HF_{(aq)}$ (48-50% by weight), HCl (37%) of Example 1, afforded a significant decrease in particle size from 500 μm to around 1-5 μm. By this method embodiment, a reaction yield of around 10% based on $Ag^+$ is obtained.

A second synthetic procedure to produce polycrystalline $Ag_6Mo_2O_7F_3Cl$ allows an improved yield based on Ag of as high as 70% using a 2:2:5:30:4:4 ratio of $Ag_2O$, $MoO_3$, 4-hydroxy-pyridine, $HF_{(aq)}$ (48-50% by weight), HCl (37%); $H_2O$, respectively.

Although the invention has been described above with respect to certain embodiments, those skilled in the art will appreciate that the invention is not limited to these embodiments since modifications, changes, and the like can be made therein without departing form the spirit and scope of the invention as set forth in the appended claims.

We claim:

1. A battery cathode comprising a silver, molybdenum, oxygen, fluorine, and chlorine material having increased discharge capacity expressed as milliampere hour per gram of material (mAh/g) above 3V as compared to that of SVO material.

2. The cathode of claim 1 which is represented by $Ag_6Mo_2O_7F_3Cl$.

3. The cathode of claim 1 where said material exhibits increased capacity expressed as milliampere hour per gram of material at a potential of 3V as compared to that of silver vanadium oxide material.

4. The cathode of claim 1 wherein the cathode comprises a layer of said material on a conductive substrate.

5. A battery comprising a cathode of claim 1, an anode, and an electrolyte.

6. The battery of claim 5 which is a medical defibrillator battery.

7. The battery of claim 5 having a lithium anode and having a maximum capacity of about 260 mAh/g above 2V and 133 mAh/g at a voltage of 3V.

8. A method of making a cathode, comprising forming a layer that comprises a material comprising silver, molybdenum oxygen, fluorine, and chlorine on an electrically conductive substrate.

9. The method of claim 8 wherein the layer comprises said material that exhibits increased capacity expressed as milliampere hour per gram of material at a potential of 3V as compared to that of silver vanadium oxide material.

10. The method of claim 8 wherein the layer further includes electrically conductive particles of carbon.

11. A method of making a battery, comprising assembling a cathode of claim 1 and an anode with an electrolyte therebetween.

12. The method of claim 11 having a lithium metal anode.

* * * * *

UNITED STATES PATENT AND TRADEMARK OFFICE
CERTIFICATE OF CORRECTION

| | | |
|---|---|---|
| PATENT NO. | : 8,062,791 B1 | Page 1 of 1 |
| APPLICATION NO. | : 12/157443 | |
| DATED | : November 22, 2011 | |
| INVENTOR(S) | : Kenneth R. Poeppelmeier et al. | |

It is certified that error appears in the above-identified patent and that said Letters Patent is hereby corrected as shown below:

Title Page, items (12) and (75)

Replace: Kenneth R. Peoppelmeier with --Kenneth R. Poeppelmeier--

Signed and Sealed this
Third Day of April, 2012

David J. Kappos
*Director of the United States Patent and Trademark Office*

UNITED STATES PATENT AND TRADEMARK OFFICE
CERTIFICATE OF CORRECTION

PATENT NO.        : 8,062,791 B1
APPLICATION NO.   : 12/157443
DATED             : November 22, 2011
INVENTOR(S)       : Kenneth R. Poeppelmeier et al.

Page 1 of 1

It is certified that error appears in the above-identified patent and that said Letters Patent is hereby corrected as shown below:

Column 1, lines 8-12 should read; CONTRACTUAL ORIGIN OF THE INVENTION
This invention was made with government support under grant number DMR0604454 awarded by the National Science Foundation and grant number N00014-07-1-0620 awarded by the Office of Naval Research. The government has certain rights in the invention.

Signed and Sealed this
Third Day of July, 2012

David J. Kappos
*Director of the United States Patent and Trademark Office*